(12) United States Patent
Larmande et al.

(10) Patent No.: US 6,588,533 B2
(45) Date of Patent: Jul. 8, 2003

(54) ANTIVIBRATION SUPPORT, AND A VEHICLE INCLUDING SUCH A SUPPORT

(75) Inventors: Franck Larmande, Chateaudun (FR); Jacques Dandre, La Chapelle du Noyer (FR); Pascal Petit, Chaingy (FR)

(73) Assignee: Hutchinson, Paris (FR)

( * ) Notice: Subject to any disclaimer, the term of this patent is extended or adjusted under 35 U.S.C. 154(b) by 15 days.

(21) Appl. No.: 09/859,040

(22) Filed: May 16, 2001

(65) Prior Publication Data

US 2001/0054523 A1 Dec. 27, 2001

(30) Foreign Application Priority Data

May 19, 2000 (FR) .............................. 00 06439

(51) Int. Cl.$^7$ ................................. B60K 5/12
(52) U.S. Cl. ................. 180/291; 180/299; 267/292
(58) Field of Search ................. 180/291, 292, 180/299; 267/292, 293, 294, 140.11, 140.3, 141

(56) References Cited

U.S. PATENT DOCUMENTS

| | | | | |
|---|---|---|---|---|
| 1,896,859 A | * | 2/1933 | Wylie et al. ................. 267/292 |
| 4,151,822 A | | 5/1979 | Miura et al. | |
| 4,842,258 A | * | 6/1989 | Misaka et al. ........... 267/140.3 |
| 4,930,758 A | * | 6/1990 | Poirier ........................ 267/292 |
| 5,242,146 A | * | 9/1993 | Tecco et al. ................. 267/293 |
| 5,263,815 A | * | 11/1993 | Brenner .................. 267/140.11 |
| 5,460,238 A | * | 10/1995 | Burke et al. ................. 180/299 |
| 5,845,734 A | * | 12/1998 | Samardzich et al. ........ 180/299 |

FOREIGN PATENT DOCUMENTS

| | | |
|---|---|---|
| EP | 0 965 473 | 12/1999 |
| FR | 2 363 033 | 3/1978 |
| FR | 2 769 962 | 4/1999 |

OTHER PUBLICATIONS

Search Report issued by the French Patent Office for parent French Application No. 00 06439 filed on May 19, 2000; report dated Feb. 14, 2001.

* cited by examiner

Primary Examiner—Frank Vanaman
(74) Attorney, Agent, or Firm—Marshall, Gerstein & Borun

(57) ABSTRACT

An antivibration support has a first strength member which includes a limit finger and two parallel support fingers, a second strength member which includes a cage surrounding the limit finger in part, and an elastomer link device interposed between the outside of the cage and the support fingers.

6 Claims, 1 Drawing Sheet

ANTIVIBRATION SUPPORT, AND A VEHICLE INCLUDING SUCH A SUPPORT

FIELD OF THE INVENTION

The present invention relates to antivibration supports (e.g. for supporting the engine of a motor vehicle on the vehicle bodywork), and it also relates to vehicles including such supports.

More particularly, the invention relates to an antivibration support for interconnecting first and second rigid elements to support a permanent axial load applied between said first and second rigid elements along a first axis, and to damp vibration between said first and second rigid elements, the antivibration support comprising:

first and second rigid strength members for connecting to the two rigid elements that are to be united, the first strength member having at least one limit finger which extends along a second axis perpendicular to the first axis and which is surrounded at least in part by a rigid cage belonging to the second strength member, said cage having an outer surface facing away from the limit finger and an inner surface facing towards the limit finger, which inner surface is adapted to co-operate with said limit finger by coming into abutment therewith to limit relative movements between the first and second strength members along said first axis and along a third axis perpendicular to the first and second axes, the first strength member having at least one support member presenting a bearing face looking substantially along the first axis towards the limit finger, and the rigid cage of the second strength member being interposed between said bearing face and the limit finger; and an elastomer link device connecting the outer surface of the rigid cage to the bearing surface of the support member, the elastomer link device being adapted to support said permanent axial load, and said elastomer link device having two arms which extend along the first axis from the second strength member and which diverge along the third axis until they reach the first strength member.

BACKGROUND OF THE INVENTION

Document U.S. Pat. No. 4,151,822 describes an example of such an antivibration support, which presents the drawbacks of being complex and expensive to make.

OBJECTS AND SUMMARY OF THE INVENTION

A particular object of the present invention is to mitigate that drawback.

To this end, the invention provides an antivibration support of the kind in question, characterized in that the two arms of the elastomer link device are connected respectively to two distinct support fingers belonging to the first strength member, said support fingers being disposed longitudinally parallel to the second axis and being offset on either side of the limit finger, the support fingers and the limit finger being formed as a single piece.

In preferred embodiments of the invention, use can optionally also be made of one or more of the following dispositions:

the second strength member is in the form of a central arch extended laterally outwards by two fixing tabs for fixing to the second rigid element, the central arch surrounding the limit finger in part;

the limit finger includes an elastomer coating;

the first strength member is a light alloy casting; and the first strength member has a body provided with fixing means suitable for enabling said body to be fixed to the first rigid element, the support fingers and the limit finger being formed integrally with said body.

The invention also provides a motor vehicle comprising bodywork connected to an engine unit via at least one antivibration support, a first element selected from the engine unit and the bodywork being fixed to the first strength member, and a second element selected from the engine unit and the bodywork being fixed to the second strength member.

Advantageously, the second strength member has a central arch which is extended laterally outwards by two fixing tabs each fixed to the second element, the limit finger being adapted to co-operate with both the central arch and said second element by coming into abutment therewith so as to limit relative movements between the first and second strength members parallel to the first and third axes.

BRIEF DESCRIPTION OF THE DRAWINGS

Other characteristics and advantages of the invention will appear on reading the following description of an embodiment of the invention, given by way of non-limiting example and with reference to the accompanying drawing.

In the drawing.

MORE DETAILED DESCRIPTION

In the various figures, the same references are used to designate elements that are identical or similar.

Figure 1:
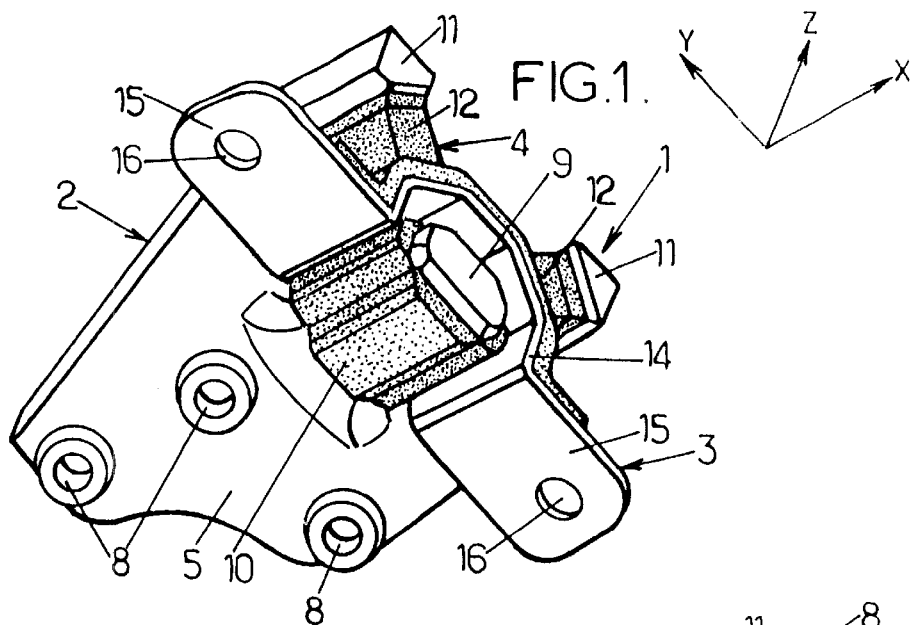
FIG. 1 is a perspective view of an antivibration support constituting an embodiment of the invention.
Figure 2:
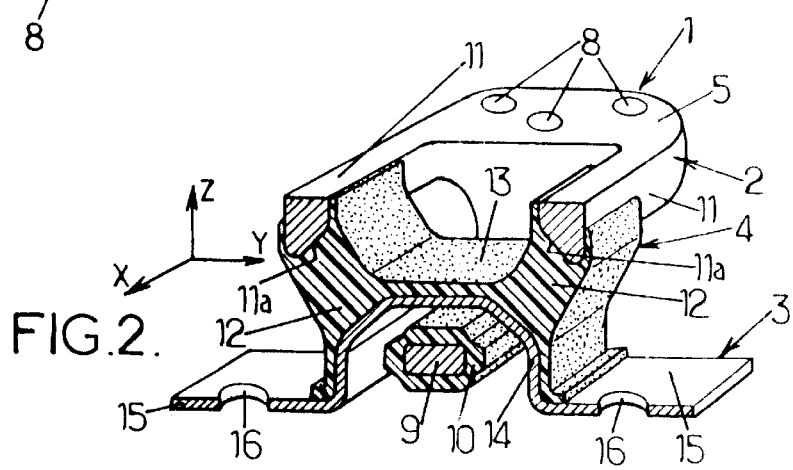
FIG. 2 is a perspective view of the FIG. 1 antivibration support, in vertical cross-section.
Figure 3:
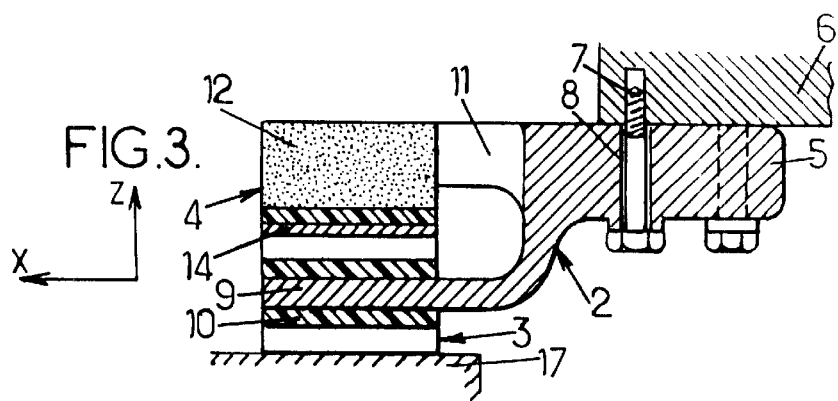
FIG. 3 is a vertical longitudinal section view through the antivibration support of FIGS. 1 and 2.

The antivibration support shown in FIGS. 1 to 3 is intended, for example, to support an engine unit of a vehicle on the bodywork of the vehicle.

To this end, the antivibration support 1 comprises first and second rigid strength members 2 and 3 for fixing respectively to the engine unit and to the bodywork of the vehicle, and which are interconnected by an elastomer body 4 adapted to support the weight of the engine unit and to damp relative vibration between the engine unit and the bodywork of the vehicle. In the particular embodiment shown in the drawing, the first strength member 2 is fixed to the engine unit and the second strength member 3 is fixed to the bodywork of the vehicle, but naturally, the opposite configuration would also be possible.

The first strength member 2 is generally in the form of a rigid metal part, e.g. made in the form of a light alloy casting and comprising:

a body 5 for fixing to a rigid body 6 belonging to the engine unit of the vehicle, e.g. by means of bolts 7 passing through bores 8 pierced through the body 5 parallel to the vertical axis Z (FIG. 3);

a rigid limit finger 9 which extends longitudinally along a horizontal axis X from the body 5 and which is preferably surrounded by an elastomer coating 10; and two finger-shaped support members 11 extending longitudinally parallel to the axis X from the body 5, the fingers 11 being disposed at a higher level than the limit finger 9, and on opposite sides of a vertical plane of symmetry containing the finger 9.

Each of the support fingers 11 has a respective bearing surface 11a, and in the example shown it faces downwards and towards the limit finger 9. Each support finger 11 has an arm 12 of elastomer belonging to the body 4 overmolded and bonded thereto, the top end of each arm 12 receiving at least the corresponding bearing surface 11a. The two arms 12 converge downwards towards each other to bottom ends where said arms 12 are overmolded and bonded onto the second strength member 3, and the bottom ends of the arms 12 are also connected to each other by an elastomer layer 13 that covers the top portion of the second strength member 3. Naturally, where appropriate, the two arms 12 could be made in the form of two mutually separate pieces of elastomer.

The second strength member 3 is in the form of a sheet metal plate which is folded to form a central arch that is substantially in the form of an upside-down U-shape for surrounding the limit finger 9, and bonded to the bottom ends of the two arms 12 of the elastomer body together with the above-mentioned elastomer layer 13.

The central arch 14 of the second strength member is extended laterally outwards by two tabs 15 projecting parallel to a horizontal axis Y perpendicular to the axis X, each tab being pierced by a hole 16, for example, to enable the second strength member to be secured to the bodywork 17 of the vehicle (FIG. 3) by means of bolts or the like (not shown).

Thus, the limit finger 9 co-operates with the arch 14 of the second strength member and with the bodywork 17 of the vehicle by coming into abutment thereagainst so as to limit relative movements between the first and second strength members 2 and 3 along the axes Y and Z.

We claim:

1. A motor vehicle comprising a bodywork, an engine unit, and at least an antivibration support, a first element selected from the engine unit and the bodywork being fixed to the first strength member, and a second element selected from the engine unit and the bodywork being fixed to the second strength member interconnecting said bodywork and engine unit to support said engine unit along a first vertical axis, and to damp vibration between said first and second rigid elements, the antivibration support comprising:

first and second rigid strength members, the first strength member having a body fixed to a first element selected from the engine unit and the bodywork and at least one limit finger and two support fingers which extend longitudinally in cantilever from said body along a second axis perpendicular to the first axis, said support fingers being disposed at a different level from said limit finger and being offset on either side of the limit finger, each support finger presenting a bearing face facing substantially toward the limit finger, the second strength member including an arch-shaped rigid cage which is open in one direction parallel to said first axis and which surrounds at least in part said limit finger, said cage being extended laterally outward by two fixing tabs fixed to a second element selected from the engine unit and the bodywork, said cage having an outer surface facing away from the limit finger and an inner surface facing toward the limit finger, which inner surface is adapted to co-operate with said limit finger by coming into abutment therewith to limit relative movements between the first and second strength members along said first axis and along a third axis perpendicular to the first and second axes, said cage being interposed between said bearing face of each support finger and the limit finger; and an elastomer link device connecting the outer surface of the rigid cage to the bearing surface of each support finger, the elastomer link device supporting said engine unit, and said elastomer link device having two arms which extend along the first axis from said cage which diverge along the third axis until they reach respectively the bearing faces of the support fingers.

2. A vehicle according to claim 1, in which the limit finger is adapted to co-operate with both the cage and said second element by coming into abutment therein so as to limit relative movements between the first and second strength members parallel to the first and third axis.

3. An antivibration support for interconnecting first and second rigid elements to support a permanent axial load applied between said first and second rigid elements along a first axis, and to damp vibration between said first and second rigid elements, the antivibration support comprising:

first and second rigid strength members, the first strength member having a body for fixing to the first rigid element and at least one limit finger and two support fingers which extend longitudinally in cantilever from said body along a second axis perpendicular to the first axis, said support fingers being disposed at a different level from said limit finger and being offset on either side of the limit finger, each support finger presenting a bearing face facing substantially toward the limit finger, the second strength member including an arch-shaped rigid cage which is open in one direction parallel to said first axis and which surrounds at least in part said limit finger, said cage being extended laterally outward by two fixing tabs for fixing to the second rigid element, said cage having an outer surface facing away from the limit finger and an inner surface facing toward the limit finger, which inner surface is adapted to co-operate with said limit finger by coming into abutment therewith to limit relative movements between the first and second strength members along said first axis and along a third axis perpendicular to the first and second axes, said cage being interposed between said bearing face of each support finger and the limit finger; and an elastomer link device connecting the outer surface of the rigid cage to the bearing surface of each support finger, the elastomer link device being adapted to support said permanent axial load, and said elastomer link device having two arms which extend along the first axis from said cage which diverge along the third axis until they reach respectively the bearing faces of the support fingers.

4. An antivibration support according to claim 3, in which the limit finger includes an elastomer coating.

5. An antivibration support according to claim 3, in which the first strength member is a light alloy casting.

6. An antivibration support according to claim 3, in which the support fingers and the limit finger are formed integrally with said body of the first strength member.

* * * * *

UNITED STATES PATENT AND TRADEMARK OFFICE
CERTIFICATE OF CORRECTION

PATENT NO. : 6,588,533 B2  
DATED : July 8, 2003  
INVENTOR(S) : Larmande et al.

It is certified that error appears in the above-identified patent and that said Letters Patent is hereby corrected as shown below:

Column 4,  
Line 15, please replace "abutment therein" with -- abutment therewith --.  
Line 17, please replace "first and third axis" with -- first and third axes --.

Signed and Sealed this

Fourth Day of November, 2003

JAMES E. ROGAN  
*Director of the United States Patent and Trademark Office*